United States Patent [19]

Ohya et al.

[11] Patent Number: 4,547,433

[45] Date of Patent: Oct. 15, 1985

[54] HEAT-SHRINKABLE LAMINATE FILM

[75] Inventors: Masaki Ohya; Yoshiharu Nishimoto; Kengo Yamazaki, all of Iwaki, Japan

[73] Assignee: Kureha Kagaku Kogyo Kabushiki Kaisha, Tokyo, Japan

[21] Appl. No.: 439,582

[22] Filed: Nov. 5, 1982

[30] Foreign Application Priority Data

Nov. 11, 1981 [JP] Japan .................................. 56-180734

[51] Int. Cl.$^4$ ..................... B32B 27/08; B32B 33/00; B32B 7/02; B65B 11/00
[52] U.S. Cl. .................................. 428/516; 428/518; 428/520; 428/910; 428/913; 428/36; 427/44; 264/176 R; 426/127
[58] Field of Search ............... 428/516, 518, 520, 913, 428/910

[56] References Cited

U.S. PATENT DOCUMENTS

| | | | |
|---|---|---|---|
| 3,617,419 | 11/1971 | Fischer et al. | 428/516 X |
| 3,741,253 | 6/1973 | Brax et al. | 428/520 |
| 4,044,187 | 8/1977 | Kremkau | 428/212 |
| 4,064,296 | 12/1977 | Bornstein et al. | 428/35 |
| 4,357,376 | 11/1982 | Nattinger et al. | 428/516 X |
| 4,391,862 | 7/1983 | Bornstein et al. | 428/516 X |
| 4,424,243 | 1/1984 | Nishimoto et al. | 428/516 X |

FOREIGN PATENT DOCUMENTS

| | | |
|---|---|---|
| 982923 | 2/1976 | Canada . |
| 0022184 | 11/1980 | European Pat. Off. . |
| 0032027 | 7/1981 | European Pat. Off. . |
| 1548820 | 10/1968 | France . |
| 2450205 | 9/1980 | France . |
| 013582 | 2/1979 | Japan .................................. 428/516 |

Primary Examiner—Patricia C. Ives
Attorney, Agent, or Firm—Finnegan, Henderson, Farabow, Garrett & Dunner

[57] ABSTRACT

Disclosed herein is a heat-shrinkable laminate film excellent in gas-barrier property and oil-resistance and heat-sealing resistance, comprising a core layer of a gas-barrier resin which is a copolymer of vinylidene chloride or a copolymer of ethylene and vinyl alcohol, the outer layer (A) of a resin which is a copolymer (I) of ethylene and alpha-olefine having specific gravity of 0.900 to 0.950 and of a crystal melting point of 110° to 130° C. or a mixture of more than 20% by weight of the copolymer (I) and less than 80% by weight of a copolymer (II) of ethylene and vinyl acetate having crystal melting point of 80° to 103° C., the other outer layers (B) of a resin which is a cross-linked material formed from a polymer selected from the group consisting of the copolymer (I), the copolymer (II) and mixture of the copolymer (I) and the copolymer (II) by exposing the polymer to an ionizing irradiation, and two adhesive layers disposed between the core layer and the outer layers (A) and (B).

7 Claims, 1 Drawing Figure

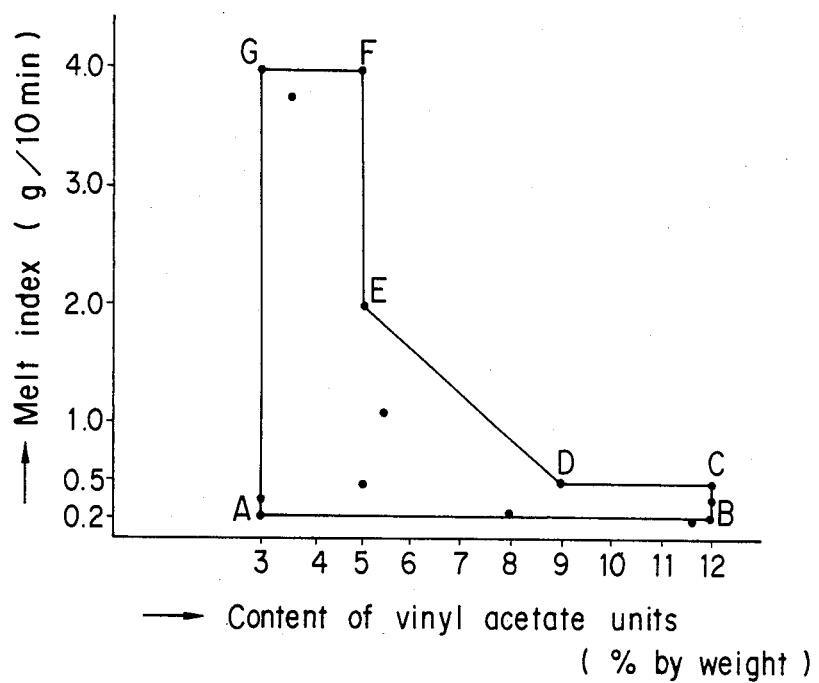

HEAT-SHRINKABLE LAMINATE FILM

BACKGROUND OF THE INVENTION

The present invention relates to a heat-shrinkable laminate film excellent in oil-resistance and peel-resistance and tear-resistance of the part sealed or the neighborhood thereof by heat shrinkage (hereinafter referred to as heat-sealing resistance), and more particularly relates to a heat-shrinkable laminated film excellent in gas-barrier property and oil-resistance and heat-sealing resistance, comprising a core layer of a gas-barrier resin which is a copolymer of vinylidene chloride or a copolymer of ethylene and vinyl alcohol, the outer layer (A) of a resin whih is a copolymer (I) of ethylene and alpha-olefin having specific gravity of 0.900 to 0.950 and of a crystal melting point of 110° to 130° C. or a mixture of more than 20% by weight of the copolymer (I) and less than 80% by weight of a copolymer (II) of ethylene and vinyl acetate having crystal melting point of 80° to 103° C., the other outer layers (B) of a resin which is a cross-linked material formed from a polymer selected from the group consisting of the copolymer (I), the copolymer (II) and mixture of the copolymer (I) and the copolymer (II) by exposing the polymer to an ionizing irradiation, and two adhesive layers disposed between the core layer and the outer layers (A) and (B).

For packaging foodstuffs with uneven and irregular shapes and forms such as fatty foodstuff, for instance, raw meats, processed meats and cheeses, the use of a heat-shrinkable packaging material is most simple and convenient. Since the thus packaged foodstuff is apt to be preserved for a long term, not only the gas-barrier property but also oil-resistance and heat-sealing resistance are required to the heat-shrinkable packaging material. Because in the cases of packaging and then sterilizing the fatty foodstuff, the occurrence of breaking the softened film of the material due to the fat and the heat by thinly stretching and of breaking the film of the material at the sealed part or the neighbouring part by the heat-shrinking stress generating during sterilization has hitherto been frequently observed.

Accordingly, a heat-shrinkable film provided with not only gas-barrier property but also oil-resistance and heat-sealing resistance has been keenly demanded from the field of food packaging industry.

Hitherto, as a heat-shrinkable film provided with gas-barrier property, a single film of a copolymer of vinylidene chloride (hereinafter referred to as co-PVD), a laminate film composed of a layer of a copolymer of ethylene and vinyl acetate (hereinafter referred to as EVA), a layer of the copolymer of vinylidene chloride and another layer of the copolymer of ethylene and vinyl acetate disclosed in Canadian Pat. No. 982,923 (hereinafter referred to as EVA/co-PVD/EVA); a laminate film consisting of a layer of EVA, a layer of co-PVD and a layer obtained by exposing a layer of EVA to an ionizing irradiation, and a laminate film consisting of a layer of EVA, a layer of a copolymer of ethylene and vinyl alcohol and a layer obtained by exposing a layer of EVA to an ionizing irradiation have been publicly known, the last two having been disclosed in Japanese Patent Application Laying Open No. 47-34565 (1972).

The single film layer of co-PVD has demerits of causing the sanitarily undesirable cases due to the migration of a plasticizer or a stabilizer therein into the foodstuff packaged within the film thereof depending on the kinds of the packaged foodstuffs and of becoming to an undersirable state for preserving a foodstuff due to the reduction of gas-barrier property owing to the relatively large amount of the additives contained in the film for retaining the strength at a low atmospheric temperature.

The laminate film having a composition of EVA/co-PVD/EVA is superior to the single layer film of co-PVD in the point of the smaller reduction of the gas-barrier property because of its smaller content of the additives owing to the higher strength of the outer layers of EVA at a low temperature, however, EVA is low in oil-resistance.

Although Japanese Patent Application Laying-Open No. 47-34565 (1972) discloses an effective method for improving the stretchability and oil-resistance of the laminate film of using the cross-linked EVA layer obtained by exposing a layer of EVA to an ionizing irradiation as one of the two outer layers, however, the other of the outer layers has not been treated with the ionizing irradiation because of the fear of decomposition of co-PVD or the copolymer of ethylene and vinyl alcohol of the core layer when the laminated layers are exposed to the ionizing irradiation.

In these situations, a heat-shrinkable film excellent in oil-resistance and gas-barrier property has been keenly demanded in the field of packaging foodstuffs.

For obtaining a packaging film excellent in oil-resistance, it is preferable to use as the two outer layers a polymer excellent in oil-resistance, for instance, a poly-alpha-olefin having a crystal melting point of higher than 110° C., however, the poly-alpha-olefin having a crystal melting point of higher than 110° C. is poor in stretchability and accordingly, the laminate film formed by merely laminating a conventional layer of poly-alpha-olefin with a layer of co-PVD or a layer of a copolymer of ethylene and vinyl alcohol cannot be easily stretched uniformly, and it is difficult to obtain a heat-shrinkable film by such a method.

Accordingly, the object of the present invention is to provide a heat-shrinkable film excellent in oil-resistance and heat-sealing resistance and possibly stretchable uniformly.

BRIEF EXPLANATION OF THE DRAWINGS

In the drawing, FIGURE shows the range of composition of the copolymer (II) of ethylene and vinyl acetate, the ordinate showing the melt index of the copolymer (g/10 min) and the abscissa showing the content (% by weight) of vinyl acetate units in the copolymer.

DETAILED DESCRIPTION OF THE INVENTION

The present invention relates to a heat-shrinkable laminate film comprising a gas-barrier layer as a core layer, a layer of a resin containing at least 20% by weight of a copolymer of ethylene and alpha-olefin of a crystal melting point of 110° to 130° C. as the outer layer (A), a cross-linked layer by exposing to irradiation as the outer layer (B) and each adhesive layer on the both sides of the core layer. More precisely, the heat-shrinkable laminated film excellent in gas-barrier property and oil-resistance and heat-sealing resistance, comprising a core layer of a gas-barrier resin which is a copolymer of vinylidene chloride or a copolymer of ethylene and vinyl alcohol, the outer layer (A) of a resin which is a copolymer (I) of ethylene and alpha-olefin having specific gravity of 0.900 to 0.950 and of a crystal melting point of 110° to 130° C. or a mixture of more than 20% by weight of the copolymer (I) and less than 80% by weight of a copolymer (II) of ethylene and vinyl acetate having crystal melting point of 80° to 103° C., the other outer layers (B) of a resin which is a cross-linked material formed from a polymer selected from the group consisting of the copolymer (I), the copolymer (II) and mixture of the copolymer (I) and the copolymer (II) by exposing the polymer to an ionizing irradiation, and two adhesive layers deposed between the core layer and the outer layers (A) and (B).

The characteristic feature of the multi-layered laminate film according to the present invention is that the outer layer (A) comprises a copolymer (I) of ethylene and an alpha-olefin of a specified crystal melting point or a mixture of the copolymer (I) and copolymer (II) at a specified ratio of mixing, and that the outer layer (B) comprises a cross-linked polymer obtained by exposing a layer of a polymer selected from the group consisting of the copolymer (I), copolymer (II) and mixtures of copolymer (I) and copolymer (II) to an ionic irradiation.

Since the outer layer (A) of the present invention contains a copolymer of ethylene and an alpha-olefin of a high crystal melting point, it is excellent in oil-resistance and heat-sealing resistance, and since the other outer layer (B) is a cross-linked polymer, it is excellent in stretchability and oil-resistance.

The copolymer (I) having crystal melting point of 110° to 130° C. and a specific gravity of 0.900 to 0.950 in the present invention is a copolymer of ethylene and an alpha-olefin having 4 to 18 carbon atoms such as butene-1, pentene-1, 4-methylpentene-1, hexene-1, octene-1, and the like, and the content of the alpha-olefin units therein is 1.0 to 30% by weight. The copolymer (I) belongs to the type of polyolefin referred to so-called LLDPE (linear low-density polyethylene) obtained by polymerization of ethylene is the presence of a catalyst mainly composed of a transition metal.

As a commercially available and usable copolymer (I), ULTZEX®, NEOZEX® (both manufactured by MITSUI Petrochem. Company) and DOWLEX® (manufactured by Dow Chem. Company) are used.

Copolymer (I) may be singly used for preparing the outer layer (A), however, in order to improve the stretchability of the outer layer (A), the copolymer (I) is preferably admixed with copolymer (II). In this case, it is necessary to use copolymer (II) of a crystal melting point of 80° to 103° C. in an amount of less than 80% by weight of the mixture.

For preparing the outer layer (B), a polymer selected from the group consisting of the copolymer (I), copolymer (II), and mixtures of copolymer (I) and copolymer (II) is treated by exposure to an ionizing irradiation to cross-link the selected polymer. The stretchability and heat-resistance of copolymer (I) and the mixture of copolymer (I) and copolymer (II) are improved by treatment with the ionizing irradiation. The ratio of admixing copolymer (I) and copolymer (II) is optionally adoptable. In this case, not only the mixture of copolymer (I) and copolymer (II) but also the copolymer (II) itself is sufficiently heat-resistant for use singly because it has been cross-linked.

Copolymer (II) which is preferable from the view points of heat-resistance and heat-sealing resistance shows a melt index of 0.2 to 4.0 (unit: g/10 min) and a content of vinyl acetate units of 3 to 12% by weight, and is a heptagonal range shown in a plane in which the melt-index is taken as ordinate and the content of vinyl acetate units (% by weight) is taken as abscissa, the apices of the heptagon being A(3, 0.2), B(12, 0.2), C(12, 0.5), D(9, 0.5), E(5, 2.0), F(5, 4.0) and G(3, 4.0) shown in FIGURE.

The cross-linking carried out for improving the stretchability and heat-resistance of the outer layer (B) is effected by exposing the once-prepared layer to an ionizing irradiation such as electron beam, ultraviolet rays and the like.

The melt index of the polymer was measured by the method of Japanese Industrial Standards (abbreviated to JIS) K-6730/1973, and the crystal melting point of the polymer was determined by using a differential scanning-type calorimeter (Model IB, made by Perkin Elmer Company).

The copolymer of vinylidene chloride according to the present invention is a copolymer comprising 65 to 95% by weight of vinylidene chloride units and 35 to 5% by weight of at least one olefinically unsaturated monomer units copolymerizable with vinylidene chloride. As the olefinically unsaturated monomer copolymerizable with vinylidene chloride, for instance, vinyl chloride, acrylonitrile, $C_1$ to $C_{18}$-alkyl acrylate, and the like can be mentioned. Of the various copolymers of vinylidene chloride, copolymer of vinylidene chloride and vinyl chloride is most common. To co-PVD, publicly known plasticizer(s), stabilizer(s) and other additive(s) may be admixed. The copolymer of ethylene and vinyl alcohol is a copolymer containing 20 to 80 mol % of ethylene units and of a degree of saponification of higher than 50 mol %. Since poly-alpha-olefin is originally poor in compatibility with co-PVD, the laminate of a layer of poly-alpha-olefin and a layer of co-PVD is easily exfoliated. Particularly, there are many cases in the field of using the laminate film according to the present invention where it is necessary to immerse the packaged foodstuff into hot water for a long period for effecting sterilization, and accordingly, the weakly adhered layers frequently exfoliate to impair the appearance of the packaged goods.

Consequently, in the present invention, it is necessary to have a strong adhesive layer on each side of the core layer to prevent the exfoliation of layers. As the adhesive layer, polyolefin modified by a carboxylic acid or a copolymer of ethylene and vinyl acetate (EVA) is used. Particularly preferable is the EVA containing 13 to 25% by weight of vinyl acetate units or a mixture derived from EVAs of an adjusted content of 13 to 25% by weight of vinyl acetate units. The thickness of the adhesive layer is usually 1 to 3 micrometers.

In the multi-layered film according to the present invention, the thickness of the outer layer is preferably more than 18% of the total thickness of the multi-layered film without distinction of (A) and (B). The copolymer (I) of ethylene and alpha-olefin and copolymer (II) of ethylene and vinyl acetate which constitute the outer layer (A) or outer layer (B) may be the same or different in the kind, ratio of mixing and thickness within the claimed ranges. However, in the case of the thickness of less than 18% of the total thickness of the laminate film, there is a fear of causing problems in its oil-resistance and heat-sealing resistance.

For providing the gas-barrier property, it is necessary to have a core layer of a thickness of more than 2 micrometers, however, the thickness of the core layer is preferably less than 30% of the total thickness of the laminate film because of a fear of reduction of the strength of the laminate film in the case of more than 30%. The total thickness of the commonly used laminate film is in a range of 20 to 120 micrometers.

The laminate film according to the present invention can be prepared by generally and publicly known processes. Namely, the cylindrically shaped laminate film (tubular laminate film) is prepared while using a number of extruders corresponding to the number of the layers constituting the laminate film with a ring-shaped die resembling to those disclosed in Japanese Patent Applications Laying-Open No. 47-34565 (1972) and No. 55-46937 (1980). Namely, each cylindrically formed layer is extruded from each die of each extruder, and after subjecting the outer layer (B) to ionizing irradiation to be cross-linked, it is adhered to the core layer and another outer layer (A) via the respective two adhesive layers.

In the case of preparing flat-type laminate films, each layer is extruded from a publicly known T-die in Japanese Patent Publication No. 55-47573 (1980) and after subjecting the outer layer (B) to ionizing irradiation to be cross-linked, it is laminated with the core layer and another outer layer (A) via the respective two adhesive layers.

The steps for preparing a cylindrically shaped laminate film are explained more in detail while referring to an example as follows:

A cylindrically shaped film to be processed into the outer layer (B) is vertically extruded downward from an annular die, and after being quenched just under the die, it is once folded flat by a pair of nip-rolls and transferred to a radio-shielded exposing chamber wherein it is exposed to electron beam from an accelerator, the exposure being not only by the accelerated electron beam but also by any one of ionizing irradiations as far as a sufficient amount of the dose is absorbed for effecting the cross-linking of the polymer of the film. The unit of the dose is "rad", and one rad corresponds to an amount of energy of 100 erg-absorbed into one gram of the exposed film in the present invention. Mrad means $1 \times 10^6$ rad.

Then, the thus exposed and cross-linked cylindrically shaped film is sent to a "coating" die while being kept at inflation by blowing air thereinto, however, to the extent not to effect orientarion either transversely or longitudinally. The "coating" die is a kind of crosshead-type annular dies and resembles to that disclosed in Japanese Patent Application Laying-Open No. 55-46937 (1980). Within the coating die, the film is coated by the adhesive, the gas-barrier layer and the adhesive in this order. The thus prepared laminate body consisting of the innermost cross-linked layer, the layer of the adhesive, the gas-barrier layer and another layer of the adhesive in this order is sent to the final coating die wherein the outer layer of the adhesive of the laminate body is coated directly with a layer of a mixture containing the copolymer of ethylene and an alpha-olefin. The thus obtained laminate body is cooled in a water bath at 15° to 25° C. to be a cylindrically shaped laminate material folded flat of 120 mm in folded width and 240 to 980 micrometers in thickness. It is biaxially stretched by inflation to obtain a cylindrically formed, multi-layered, heat-shrinkable film. Instead, the cross-linked outer layer (B) is directly coated within the coating die by a tri-ply laminate film consisting of the layer of the adhesive, the gas-barrier layer and another layer of the adhesive in this order, and then the thus prepared 4-ply laminate film is coated with the outer layer (A) to obtain the heat-shrinkable multi-layer film with the same composition as above.

Since the heat-shrinkable laminate film obtained according to the present invention is excellent in oil-resistance, heat-sealing resistance and gas-barrier property, it is used for packaging various kinds of foodstuffs. Particularly, as a material for packaging fatty foodstuffs necessitating sterilization at a high temperature, it is most preferably utilized with an excellent result.

The present invention will be explained more in detail while referring to the non-limitative concrete examples as follows:

EXAMPLES 1 TO 12 AND COMPARATIVE EXAMPLES 1 TO 6

Four kinds of the polymers or copolymers shown in Table 1 or four kinds of the mixture of those polymers or copolymers shown in Table 1, respectively selected for the outer layer (A), the adhesive layers, the core layer and another outer layer (B) as are shown in combination in Table 2 were respectively melt-extruded by the separate extruders. The extruded cylindrical material for the outer layer (B) was quenched in a cooling bath at 15° to 25° C. and folded flat into a folded cylindrical film of 120 mm in folded width and 70 to 400 micrometers in thickness (single). The thus folded material was passed through an exposing chamber at an irradiation of 500 keV at a speed of 10.7 m/min 4 times. Thus, the material absorbed a dose of about 6 Mrad. The thus exposed material for the outer layer (B) was sent to the coating die and coated therein with the respectively transferred three kinds of the extruded cylindrical materials, namely, at first with the material for the adhesive layer, then with the material for the gas-barrier layer, then with the same material for the adhesive layer and finally with the material for another outer layer (A). The thus prepared multi-layer film was then cooled in another cooling bath at 15° to 25° C. and folded flat to be a folded cylindrical laminate film of 120 mm in folded width and 240 to 980 micrometers in thickness. The laminate film was heated for about 12 sec while being passed through a hot-water bath at a temperature shown in Table 2 at a speed of 5 m/min, and then passed through a pair of nip rolls No. 1 revolving at a peripheral speed of 5 m/min and consectively passed through a pair of nip rolls No. 2 revolving at a peripheral speed of 15 m/min. while being cooled by an atmosphere at an ordinary temperature.

During passing between the two pairs of nip rolls Nos. 1 and 2, the cylindrical laminate film was stretched 3 times in the machine direction and simultaneously stretched transversely 3.3 times by an introduced air thereinto with an appearance of inflation. The thus obtained biaxially stretched laminate film was about 360 mm in folded width and about 24 to 98 micrometers in thickness.

Table 1 shows the physical properties of the polymers and copolymers used in Examples; Table 2 shows the constitution of the respective layers of the laminate films; Table 3 shows the methods for examining the physical properties of the thus obtained laminate films and Table 4 shows the results of the examination of the final products.

In addition, Comparative Examples 1 to 6 were the representative runs carried out under the respective different combinations of the components of the laminate film from those conforming to the present invention.

As are seen in Examples 1 to 12 shown in Table 4, every one of the heat-shrinkable laminate films according to the present invention was excellent in stretchability, oil-resistance, heat-sealing resistance and gas-barrier property and exhibited a sufficient thermal shrinkage at 90° C.

On the other hand, in Comparative Example 1, the outer layer was composed of a mixture of EVA and a low density polyethylene of a crystal melting point of below 110° C., and in Comparative Example 2, the outermost layer was composed solely of EVA.

Accordingly, both the respective specimens of Comparative Examples 1 and 2 were poor in heat-sealing resistance.

In Comparative Example 3, since the outer layer (B) composed of LLDPE has not been exposed to ionizing irradiation and thus not-cross-linked, the specimen was unstable in stretching, and in addition, since the amount of LLDPE contained in the mixture of resins composing another outer layer (A) is 10% by weight, the oil-resistance of the outer layer (A) was poor.

In Comparative Example 4, owing to the exposure of the outer layer (B) to ionizing irradiation to effect the cross-linking, the oil-resistance of the outer layer (B) was excellent, however, since another outer layer (A) was composed singly of EVA, its oil-resistance was poor.

The laminate of Comparative Example 5 was poor in oil-resistance at the side of the outer layer (A) and provoked an interfacial exfoliation accompanied by the reduction of heat-sealing resistance due to the lack of the two adhesive layers.

The laminate film of Comparative Example 6 was poor in oil-resistance because of the single use of EVA in preparing the outer layer (A).

TABLE 1

Physical Properties of Polymers and Copolymers

| Polymer or Copolymer | Index used in Tab. 2 | Melt index (g/10 min) | Specific gravity | Content of vinyl acetate units (% by weight) | Crystal melting point (°C.) |
|---|---|---|---|---|---|
| Copolymer of vinylidene chloride*[1] | co-PVD-1 | — | — | — | — |
| Copolymer of vinylidene chloride*[2] | co-PVD-2 | — | — | — | — |
| Copolymer of ethylene and vinyl alcohol*[3] | co-PE-VOH | 5.8 | 1.14 | — | 160 |
| LLDPE*[4] | LLDPE-1 | 2.5 | 0.922 | — | 122 |
| LLDPE*[5] | LLDPE-2 | 0.7 | 0.922 | — | 120 |
| Low-density polyethylene | PE | 1.2 | 0.922 | — | 107 |
| EVA | EVA-1 | 0.3 | 0.93 | 3 | 103 |
| EVA | EVA-2 | 3.8 | 0.93 | 3.5 | 101 |
| EVA | EVA-3 | 0.5 | 0.93 | 5 | 97 |
| EVA | EVA-4 | 2.0 | 0.93 | 5 | 97 |
| EVA | EVA-5 | 3.3 | 0.93 | 6 | 95 |
| EVA | EVA-6 | 0.2 | 0.93 | 8 | 94 |
| EVA | EVA-7 | 1.5 | 0.93 | 10 | 91 |
| EVA | EVA-8 | 3 | 0.93 | 10 | 90 |
| EVA | EVA-9 | 0.35 | 0.94 | 12 | 85 |
| EVA | EVA-10 | 0.8 | 0.94 | 12 | 85 |
| EVA | EVA-11 | 1.1 | 0.94 | 15 | 82 |
| EVA | EVA-12 | 3 | 0.94 | 15 | 82 |
| EVA | EVA-13 | 6 | 0.95 | 28 | — |
| EVA modified with carboxylic acid*[6] | mod-EVA | 15 | 0.97 | 19 | — |

Notes:
*[1] A mixture of 100 parts by weight of a copolymer of 85% by weight of vinylidene chloride and 15% by weight of vinyl chloride and one part by weight of epoxidized soy bean oil.
*[2] A mixture of 100 parts by weight of a copolymer of 80% by weight of vinylidene chloride and 20% by weight of vinyl chloride and 0.5 part by weight of epoxidized soy bean oil.
*[3] Sold under the registered trade name of EVAL ® by KURARE Company.
*[4] Linear low density polyethylene sold under the trade name of ULTZEX ® by MITSUI Petrochem. Company.
*[5] Another linear low density polyethylene sold under the registered trade name of NEOZEX ® by the same company.
*[6] An adhesive sold under the registered trade name of ADMER ® by the same company as above.

TABLE 2

Constitution of Each Layer and Temperature of Hot-water Bath
Parenthesized figure shows the thickness in micrometer

| Example No. | Outer layer (A) | Adhesive Layers | Core Layer | Adhesive Layers | Outer Layer (B) | Temperature of hot-water bath (°C.) |
|---|---|---|---|---|---|---|
| 1 | LLDPE-1:EVA-4 = 3:7*[1] (10) | EVA-4:EVA-13 = 5:5 (1) | co-PVD-1 (3) | EVA-4:EVA-13 = 5:5 (1) | Exp LLDPE-1:EVA-1 = 3:7**[2] (10) | 95 to 97 |
| 2 | LLDPE-2::EVA-2 = 4:6 (10) | same as above (1) | same as above (6) | same as above (1) | Exp LLDPE-2:EVA-2 = 3:7 (20) | 96 to 98 |
| 3 | LLDPE-1:EVA-5 = 4:6 (12) | same as above (2) | co-PVD-2 (10) | same as above (2) | Exp LLDPE-1:EVA-3 = 3:7 (34) | 94 to 96 |
| 4 | LLDPE-1:EVA-9 = 6:4 (24) | EVA-12 (3) | same as above (28) | EVA-12 (3) | Exp LLDPE-1:EVA-6 = 4:6 (40) | 95 to 97 |
| 5 | LLDPE-2:EVA-7 = 3:7 (14) | same as above (2) | same as above (10) | same as above (2) | Exp LLDPE-2:EVA-7 = 2:8 (32) | 91 to 93 |
| 6 | LLDPE-1:EVA-10 = 5:5 (15) | EVA-8:modEVA = 5:5 (2) | same as above (6) | EVA-8:mod-EVA = 5:5 (2) | Exp LLDPE-1:EVA-10 = 5:5 (15) | 95 to 97 |
| 7 | LLDPE-2:EVA-11 = 7:3 (10) | same as above (1) | same as above (8) | same as above (1) | Exp LLDPE-2:EVA-9 = 3:7 (20) | 95 to 97 |
| 8 | LLDPE-1:EVA-7 = 2:8 (15) | EVA-12 (2) | same as above (8) | EVA-12 (2) | Exp EVA-7 (33) | 90 to 92 |
| 9 | LLDPE-1:EVA-4 = 2:8 (12) | same as above (1) | same as above (10) | same as above (1) | Exp LLDPE-1 (7) | 96 to 98 |
| 10 | LLDPE-1:EVA-10 = 5:5 (10) | same as above (1) | same as above (8) | same as above (1) | Exp EVA-6 (25) | 90 to 92 |
| 11 | LLDPE-1:EVA-7 = 2:8 (9) | mod-EVA (1) | co-PE-VOH (4) | mod-EVA (1) | Exp LLDPE-1:EVA-3 = 2:8 (15) | 96 to 98 |
| 12 | LLDPE-1:EVA-11 = 3:7 (9) | EVA-8:mod-EVA = 5:5 (1) | same as above (4) | EVA-8:mod-EVA = 5:5 (1) | Exp LLDPE-1:EVA-4 = 3:7 (15) | 97 to 98 |
| Comparative Example | | | | | | |
| 1 | PE:EVA-7 = 1:9 (2) | EVA-12 (2) | co-PVD-2 (10) | EVA-12 (2) | PE:EVA-7 = 2:8 (26) | 90 to 92 |
| 2 | EVA-7 (15) | same as above (2) | same as above (8) | same as above (2) | EVA-7 (33) | 90 to 92 |
| 3 | LLDPE-1:EVA-7 = 1:9 (12) | same as above (1) | same as above (10) | same as above (1) | LLDPE-1 (7) | 97 to 98 |
| 4 | EVA-7 (15) | none | same as above (10) | none | Exp EVA-7 (35) | 91 to 93 |
| 5 | same as above (15) | none | same as above (10) | none | Exp PE:EVA-4 = 2:8 (35) | 92 to 94 |
| 6 | same as above (9) | mod-EVA (1) | co-PE-VOH (4) | mod-EVA (1) | Exp EVA-7 (15) | 96 to 98 |

Notes:
*[1] LLDPE-1:EVA-4 = 3:7 means that the polymer for outer layer(A) is a mixture of 3 parts by weight of LLDPE-1(linear low density polyethylene, ULTZEX) and 7 parts by weight of EVA-7 (refer to Table 1).
**[2] Exp LLDPE-1:EVA-1 = 3:7 means that the polymer for outer Layer(B) is a mixture of 3 parts by weight of LLDPE -1(see above) and 7 parts by weight of EVA-1, and the layer has been exposed to electron beam.

TABLE 3
Methods for Determination of Physical Properties

| Physical property | Method for Determination |
|---|---|
| Shrinkage in hot water | Each of 20 specimens of the product (film) of 10 × 10 cm was immersed into hot water at 90° C. for one min at a relaxed state, and shrinkage of the specimen in length and width to the original dimensions was determined, the value being shown in average. |
| Oil-resistance | Each three specimens of the product was stretched on a frame, and after being coated with lard, it was immersed into hot water at 90° C. for 3 sec, 3 min and 10 min, respectively. The appearance of the outer layers of the thus immersed specimens was examined to find the presence or absence of damage and impairment. The specimen of each Example without any damage or impairment was judged as excellent after immersing for 10 min, good after immersing for 3 min, fair after immersing for 3 sec, and poor when any damage or impairment was found after immersing for 3 sec. |
| Heat-sealing resistance | 1 Each ten specimens of pork packaged within each specimen of the laminate film was immersed in hot water at 90° C. for 3 sec and then cooled to a room temperature to be examined the number of packages with broken part at the heat-sealed region.<br>2 The same test was carried out on each ten packaged meat loaf, except for 3 min instead of 3 sec.<br>3 The same test was carried out on each ten packaged loast pork, except for 10 min instead of 3 min.<br>Of the tested 30 packaged goods, the lot in which no broken part was found judged as excellent; the lot in which no broken part was found only in the tests 2 and 3 was judged as good; the lot in which no broken part was found only in the test 3 was judged as fair and the lot in which a positive number of broken part was found in the test 3. |

TABLE 4
Performance Test Results

| | | Heat shrinkage (%) | | Oil-resistance | | Heat sealing | |
|---|---|---|---|---|---|---|---|
| | Stretchability | L | T | Layer (A) | Layer (B) | resistance | Gas-barrier property |
| Example No. | | | | | | | |
| 1 | stretchable | 35 | 37 | excellent* | excellent | excellent | 68 |
| 2 | stretchable | 32 | 34 | excellent | excellent | excellent | 34 |
| 3 | stretchable | 34 | 40 | excellent | excellent | excellent | 42 |
| 4 | stretchable | 32 | 38 | excellent | excellent | excellent | 15 |
| 5 | stretchable | 43 | 47 | excellent | excellent | good | 42 |
| 6 | stretchable | 31 | 36 | excellent | excellent | excellent | 70 |
| 7 | stretchable | 32 | 37 | excellent | excellent | excellent | 53 |
| 8 | stretchable | 45 | 48 | good | excellent | fair | 53 |
| 9 | stretchable | 30 | 32 | good | excellent | excellent | 42 |
| 10 | stretchable | 47 | 52 | excellent | excellent | good | 53 |
| 11 | stretchable | 20 | 25 | good | excellent | excellent | 60 |
| 12 | stretchable | 16 | 23 | excellent | excellent | excellent | 60 |
| Comparative Example | | | | | | | |
| 1 | stretchable | 43 | 47 | poor | poor | poor | 42 |
| 2 | stretchable | 47 | 54 | poor | poor | poor | 53 |
| 3 | unstable | 29 | 35 | poor | excellent | excellent | 42 |
| 4 | stretchable | 46 | 49 | poor | excellent | fair | 42 |
| 5 | stretchable | 44 | 48 | poor | excellent | poor | 42 |
| 6 | stretchable | 19 | 22 | poor | excellent | fair | 60 |

What is claimed is:

1. A heat-shrinkable laminated film excellent in gas-barrier property and oil-resistance and heat-sealing resistance, comprising:

a core layer of a gas-barrier resin which is a copolymer of vinylidene chloride or a copolymer of ethylene and vinyl alcohol, an outer layer (A) of a resin which is a copolymer (I) of ethylene and an alpha-olefin of 4 to 18 carbon atoms and having a specific gravity of 0.900 to 0.950 and a crystal melting point of 110° to 130° C. or a mixture of more than 20% by weight of the copolymer (I) and less than 80% by weight of a copolymer (II) of ethylene and vinyl acetate having a crystal melting point of 80° to 103° C., another outer layer (B) of a resin which is a cross-linked material formed from a polymer selected from the group consisting of the copolymer (I), the copolymer (II) and a mixture of the copolymer (I) and the copolymer (II) by exposing the polymer to an ionizing irradiation, and two adhesive layers each adhesive layer being disposed between the core layer and one of the outer layers (A) and (B).

2. A heat-shrinkable laminated film according to claim 1, wherein said outer layer (B) is made of a cross-linked material formed from the copolymer (II) by exposing the copolymer (II) to an ionizing irradiation.

3. A heat-shrinkable laminated film according to claim 1, wherein said outer layer (B) is made of a cross-linked material formed from the copolymer (I) by exposing the copolymer (I) to an ionizing irradiation thereof.

4. A heat-shrinkable laminated film according to claim 1, wherein said outer layer (B) is made of a crosslinked material formed from a mixture of 20 to 70% by weight of the copolymer (I) and 80 to 30% by weight of the copolymer (II) by exposing the mixture to an ionizing irradiation.

5. A heat-shrinkable laminated film according to claim 1, wherein said copolymer (II) forming the outer layer (B) is selected from the group having a relationship between the content (% by weight) of vinyl acetate units of the copolymer and the melt-index (g/10 min) thereof falling in the heptagonal range made of the seven points A(3, 0.2), B(12, 0.2), C(12, 0.5), D(9, 0.5), E(5, 2.0), F(5, 4.0) and G(3, 4.0) on a plane having said content of vinyl acetate as the abscissa and said melt-index as the ordinate.

6. A heat-shrinkable laminated film according to any one of claim 1 wherein said adhesive layer is selected from poly-olefin modified by carboxylic acid and copolymers of ethylene and vinyl acetate.

7. The heat-shrinkable laminate film according to claim 1 which has been biaxially stretched after layer (B) is laminated to the other layers.

* * * * *